J. A. Beal,
Potato Probe.

No. 112,312. Patented Mar. 7, 1871.

Witnesses:
R. T. Campbell.
J. N. Campbell.

Inventor
John A. Beal
by
Mason, Fenwick & Lawrence.

United States Patent Office.

JOHN A. BEAL, OF WATERFORD, NEW YORK.

Letters Patent No. 112,312, dated March 7, 1871.

IMPROVEMENT IN POTATO-PROBES.

The Schedule referred to in these Letters Patent and making part of the same.

To all whom it may concern:

Be it known that I, JOHN A. BEAL, of Waterford, in the county of Saratoga and State of New York, have invented a new and useful article of manufacture, to wit, a Potato-Probe; and I do hereby declare that the following is a full, clear, and exact description thereof, reference being had to the accompanying drawing making part of this specification, in which—

Similar letters of reference indicate corresponding parts in the several figures.

Figure 1:
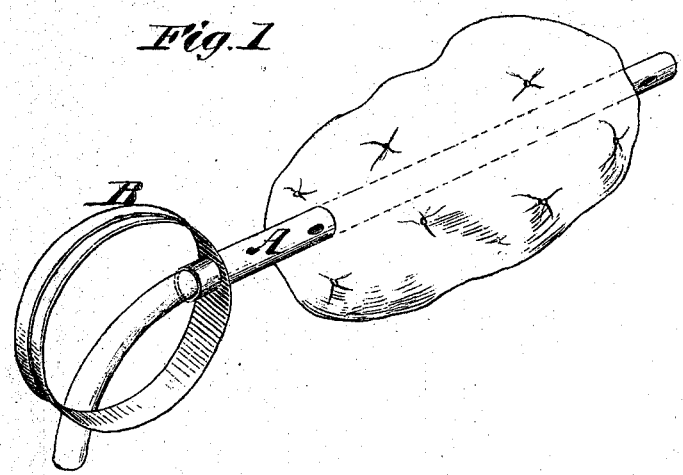
Figure 1 is a perspective view of the probe forced through a potato.
Figure 2:
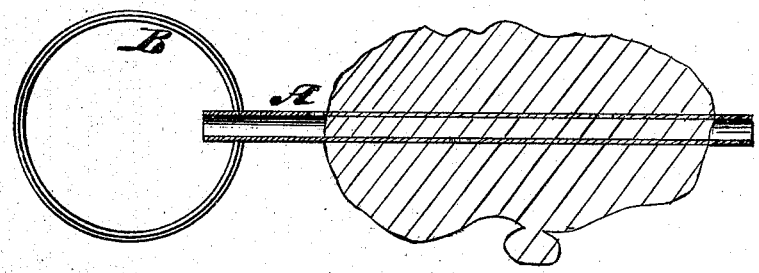
Figure 2 is a sectional view of the probe forced through a potato.
Figure 3:
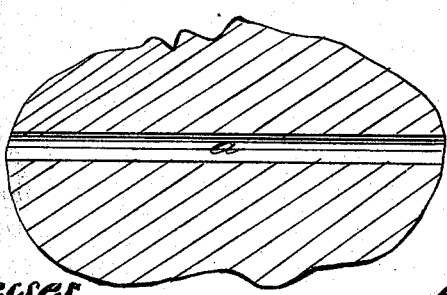
Figure 3 is a sectional view of a potato having a hole through it.

The object of my invention is to provide a simple and cheap instrument, consisting of a tube applied to a suitable handle, by means of which potatoes can be perforated before they are put into the pot to boil, thus allowing them to cook through in a comparatively short time without liability of bursting and becoming watery.

The following is a description of my new article of manufacture.

In the accompanying drawing—

A represents a tube of suitable diameter and length, which is open at both ends, and which is applied to a handle, B. This tube is open at both ends to allow the cylinders cut out of potatoes to escape freely, and it is perforated at different points between its ends to allow it to be readily cleaned after use.

The tube will be made of tinned iron or other suitable material, and it may be made slightly tapering from its handle-end to its penetrating-end, which latter may, if desirable, be reduced to a sharp cutting-edge.

This instrument is used by forcing it entirely through potatoes, through their longer axes, thus removing a portion of each potato, and leaving a hole, a, for the circulation of boiling water and steam.

It is obvious that potatoes thus treated will cook in boiling water more rapidly than potatoes not perforated, and that they will not break or burst in the water while cooking, as a free escape of steam is permitted.

I claim, as a new and improved article of manufacture—

The within-described potato-probe, consisting of a cutting-tube open at both ends, and provided with a handle on one end, as set forth.

JOHN A. BEAL.

Witnesses:
   S. EMIGH,
   D. W. VAN HOWENBURG.